United States Patent [19]

Login et al.

[11] Patent Number: 4,473,689

[45] Date of Patent: Sep. 25, 1984

[54] PROCESS FOR THE AQUEOUS POLYMERIZATION OF ACRYLAMIDE

[75] Inventors: Robert B. Login, Woodhaven; Michael J. Anchor, Canton Township, Wayne County, both of Mich.

[73] Assignee: BASF Wyandotte Corporation, Wyandotte, Mich.

[21] Appl. No.: 243,552

[22] Filed: Mar. 13, 1981

Related U.S. Application Data

[63] Continuation of Ser. No. 107,474, Dec. 26, 1979, abandoned.

[51] Int. Cl.$^3$ ............................................. C08F 4/40
[52] U.S. Cl. .................................... 526/81; 526/91; 526/93; 526/303.1
[58] Field of Search ............... 526/80, 81, 86, 93, 526/94

[56] References Cited

U.S. PATENT DOCUMENTS

| | | | |
|---|---|---|---|
| 2,983,717 | 5/1961 | Henley | 526/93 |
| 3,255,164 | 6/1966 | Visger | 526/229 |
| 3,332,922 | 7/1967 | Hoover | 526/93 |
| 3,573,242 | 3/1971 | Scoggins | 526/229 |
| 3,732,184 | 5/1973 | Lindemann | 526/229 |
| 3,770,680 | 11/1973 | Iacoviello | 526/93 |
| 4,092,467 | 5/1978 | Welcher | 526/80 |
| 4,103,080 | 7/1978 | Böhmer | 526/81 |

*Primary Examiner*—Christopher A. Henderson
*Attorney, Agent, or Firm*—Bernhard R. Swick

[57] ABSTRACT

There is disclosed a process for the aqueous solution or emulsion polymerization of acrylamide monomer to produce homopolymers of very high molecular weight using mixtures of water and monomer at least one of which can be contaminated with small amounts of polymerization inhibiting components. In the process, a minimum effective amount of a redox catalyst is utilized in order to obtain very high molecular weight by incrementally adding one member of a redox pair to a solution of the monomer containing a second redox pair number. The process can be initiated at ambient temperatures and pressures, and polymerization is effected without providing additional heat to the reaction mass. Utilizing monomer concentrations of about 10 to about 50 percent by weight, molecular weights of about 1,000,000 to 10,000,000 can be obtained.

12 Claims, No Drawings

PROCESS FOR THE AQUEOUS POLYMERIZATION OF ACRYLAMIDE

This is a continuation, of application Ser. No. 107,474, filed Dec. 26, 1979 and now abandoned.

BACKGROUND OF THE INVENTION

1. Field of the Invention

This invention relates to the production of very high molecular weight homopolymers from acrylamide monomer by the process of aqueous polymerization.

2. Description of the Prior Art

In U.S. Pat. No. 3,573,263 there is disclosed the preparation of water-soluble, high molecular weight synthetic polymers from monomers such as acrylic acid and acrylamide by the use of a redox system in conjunction with the use of an azo compound free-radical source. As indicated therein, the use of a redox catalyst only, without the additional azo compound catalyst, results in an exotherm during the process which causes greater initiator activity and thus, results in a polymer having a low molecular weight.

The problems involved in the preparation of high molecular weight polymers utilizing solution or emulsion polymerization of ethylenically unsaturated monomers are extensively discussed in U.S. Pat. No. 4,103,080, incorporated herein by reference. In prior art solution polymerization processes, a polymerization temperature of about 60 to about 70° C. has been used which causes the polymerization initiator to decompose rapidly. This results in too many polymer chains starting to form simultaneously with the end effect that too many short chains are produced. The resulting polymers are inadequate since they are low in molecular weight. This has led to the use of such slower-decomposing polymerization redox initiators as amines and ammonia. With the use of ammonia, generally extensive pH controls must be utilized to avoid the loss of ammonia and an uncontrolled course of reaction.

The process of U.S. Pat. No. 4,103,080 involves the addition of catalysts in at least three steps at intervals during the course of the polymerization in order to maintain the initiator concentration low enough so as to obtain the very high molecular weight polymers desired. In U.S. Pat. No. 4,042,772, the problem of obtaining acrylamide and acrylamide-acrylic acid polymers utilizing contaminated acrylamide is solved by the use of urea as an additive during the polymerization. Use of a water-in-oil emulsion polymerization process is described as particularly suitable for the production of said polymers utilizing a redox polymerization catalyst. Bikales in *Water-Soluble Polymers*, Plenum Press, 1973, page 215, describe a commercial process for the production of acrylamide polymers in which one of the components of the redox catalyst system is added gradually to a second component of the redox system. For instance, the reducing agent is added gradually to control the rate of polymerization and prevent the temperature from becomming excessive. Other processes describing the polymerization of ethylenically unsaturated monomers utilizing redox polymerization catalysts are U.S. Pat. No. 3,509,113 and U.S. Pat. No. 4,020,256. There is no indication in the prior art that very high molecular weight polymers can be obtained by a process in which a *minimum* of a redox catalyst, i.e., just sufficient to initiate polymerization, is utilized. In the process disclosed herein, said minimum is determined, for instance, by titrating a peroxy compound into a reaction mixture containing one member of a redox pair as an activator for the peroxy compound.

SUMMARY OF THE INVENTION

It is an object of this invention to provide to the art a process for the preparation of very high molecular weight homopolymers by the aqueous polymerization, particularly the solution polymerization of acrylamide utilizing a redox polymerization catalyst system wherein polymerization is initiated at ambient temperatures and pressures. Acrylamide is an unusual monomer in that under aqueous polymerization conditions, the free-radical terminus of the acrylamide polymer chain is active much longer than with other ethylenically unsaturated polymerizable monomers. Thus, very high molecular weight homopolymers can be obtained, for instance, by the addition of a minimum of a peroxy compound to an aqueous solution of an acrylamide monomer containing one member of a redox pair as a peroxy compound activator. Unexpectedly, the process results in a very high molecular weight polymer in aqueous solution which is free of insoluble material thus making the polyacrylamide solution obtained particularly suited for use as a thickener in water flood methods used in secondary petroleum oil recovery. The addition of the peroxy compound to the aqueous solution of said monomer and said activator, or alternatively, the addition of the activator to an aqueous solution of said monomer in admixture with a peroxy compound, is accomplished incrementally and terminated upon initiation of polymerization, as indicated by an exotherm of about 2° C. to 5° C. The minimum amount of peroxy or activator compound can thus be added to the polymerization mixture. Thereafter, the polymerization mixture is heated by the heat of reaction.

The incremental addition of the peroxy or activator compound to the polymerization mixture containing a second member of a redox pair overcomes many of the defects in the redox polymerization processes of the prior art in that very high molecular weight polymers of the invention can be obtained since an excess of catalyst is not present to cause the production of an excessive number of polymer chains which would lead to a lower molecular weight polymer being produced. The process is particularly suited to the polymerization of acrylamide monomer by an aqueous media solution polymerization process wherein at least one of the monomer or the aqueous media is contaminated with small amounts of polymerization inhibitors.

DETAILED DESCRIPTION OF THE INVENTION AND PREFERRED EMBODIMENTS

The invention is concerned with an aqueous solution, emulsion, or solution precipitation process for polymerization of acrylamide polymers. In the process of the invention, free-radical initiators of the redox type are used. Preferably, these include organic or inorganic peroxy compounds. Useful peroxy compounds include ammonium persulfate, potassium persulfate, hydrogen peroxide, diisopropyl peroxydicarbonate, bis(2,4-dichlorobenzoyl) peroxide, caprylyl peroxide, lauroyl peroxide, acetyl peroxide, tert-butyl peroxyisobutyrate, benzoyl peroxide, bis(p-chlorobenzoyl) peroxide, hydroxyheptyl peroxide, cyclohexanone peroxide, di-tert-butyl peroxyphthalate, tert-butyl peroxyacetate, tert-butyl peroxybenzoate, dicumyl peroxide, methyl ethyl ketone peroxide, di-tert-butyl peroxide, p-methane hydroperoxide, pinane hydroperoxide, cumene hydroperoxide, and 2,5-dimethyl-2,5-dihydroperoxide. These peroxy compounds are used in accordance with the process of the invention preferably in conjunction with trace, or co-catalytic, amounts of a metal ion such as an iron (ferrous) salt, for instance, ferrous sulphate or iron pyrophosphate. Corresponding amounts of a peroxy compound activator, the second member of the redox pair, function as a reducing agent. The ferrous ion can be added in many forms, for instance, as colloidal dispersions of an iron pyrophosphate complex. Reducing sugars can be added to insure presence of the ferrous state and to act as chelating agents. The sodium formaldehyde sulfoxylate-iron-Versene complex is advantageous in that much less iron is required than is the case with the iron pyrophosphate system. Versene is a trademark for disodiumethylenediaminetetraacetate dihydrate, a chelating agent, which acts to keep the iron in a water-soluble state. Other metal ions can also be used as co-catalysts, particularly when complexed with salts of ethylenediaminetetraacetic acid or salicylic acid. Copper is preferred over the ferric ion since the cupric ion will not act as a chain terminator. Useful peroxy compound activators are sodium sulfite, sodium bisulfite, sodium metabisulfite, and combinations of sodium bisulfite with ethylenediaminetetraacetic acid. Typical useful redox pairs and coupling metal salts are ammonium persulfate and 3,3',3''-nitrilotrispropionamide; sodium bromate and sodium sulfate; sodium bromate, sodium persulfate, and sodium sulfite or sodium bisulfite; potassium persulfate and sodium metabisulfite; ammonium persulfate and sodium bisulfite; ammonium persulfate and sodium metabisulfite; and hydrogen peroxide and thiourea.

In accordance with the process of the invention, a first redox pair member, i.e., the peroxy compound, is added to the reaction vessel in combination with water and the acrylamide monomer. The proportion utilized is generally about 0.05 to about 0.3 percent by weight based upon the weight of the monomer, preferably about 0.05 percent to about 0.2 percent by weight based upon the weight of the monomer.

In the process of the invention, water is utilized as a reaction medium and a metal ion is present as a co-catalyst. Preferably, the water is deionized but the process of the invention is sufficiently flexible to utilize water contaminated with small amounts of various ions which would normally interfere with polymerization. In addition, acrylamide monomers can be used in the process of the invention in the unpurified form. Thus, the impure acrylamide utilized by Dailweber et al, in the polymerization disclosed in U.S. Pat. No. 4,042,772, can be utilized without the expedient of polymerization in the presence of urea.

As is well known, the molecular weight of polymers produced by a process of polymerization such as contemplated herein varies directly with the monomer concentration used in making the polymer. If higher molecular weight polymers are desired, the monomer concentration should be about 10 to about 50 percent by weight, preferably about 15 to 35 percent by weight, of the total polymerization reaction mixture. When monomer concentration rises above 50 percent by weight of the reaction mixture, the polymeric products formed generally contain a large amount of low molecular weight components. Generally, the polymers of the invention have a molecular weight within the range of about 1,000,000 to about 10,000,000.

By the process of the invention, acrylamide homopolymers can be prepared at ambient temperatures and pressures. Certain of the polymerization conditions required are those under which polymers are prepared in the prior art. Thus, the aqueous solution of monomers containing one member of a redox pair as activator is purged with nitrogen or carbon dioxide or other inert gas in order to remove entrained oxygen which would interfere with the polymerization. In the process of the invention, the polymerization is initiated at ambient temperatures and at atmospheric pressure. No additional heat need be added to the polymerization mixture since, once the polymerization is initiated by the generation of sufficient free radicals, the heat released is sufficient for polymerization. Generally, the reaction temperature is not allowed to rise above a maximum temperature of about 60° C., preferably a maximum of about 50° C., and most preferably, a maximum of about 40° C.

Molecular weight regulators, such as those disclosed in the prior art, are generally not included in the reaction mixture since very high molecular weights are desirable. Thus, compounds such as acetone, methanol, ethanol, isopropyl alcohol, polyethylene glycol, etc., are unnecessary in the process of the invention. The control of the pH of the reaction medium is also generally unnecessary. This is not to imply that the pH of the reaction medium is not important, since hydrolysis of amide groups can take place at high pH and imidization is favored at low pH and at high temperatures. A pH range of about 3 to about 8 is satisfactory, preferably about 5 to about 7. Generally the tap water available has a pH within this range and therefore is acceptable for use in the process of the invention.

The polymerization reaction of the invention also can be carried out in the presence of a salt or a buffer system involving the use of one or more salts in combination. Such buffer systems can include an alkali metal or an ammonium acetate, carbonate, bicarbonate, chloride, phosphate, sulfate, bisulfate, borate, or, generally, weak acids and their corresponding alkali metal and ammonium salts, or ammonium acetate, carbonate, bicarbonate, chloride, phosphate, sulfate, bisulfate, and borate salts or combinations of any of the above. The amount of buffer salt which can be used is about 0.1 percent to about 2 percent by weight, preferably about 0.2 percent to about 1 percent by weight of the reaction mixture. The pH can be buffered in the range of about 3 to about 8, preferably about 5 to about 7.

The process of the invention can be carried out with or without the addition of one or more other materials commonly added to the reaction mixtures of the prior art. For instance, a surfactant can be employed where it is necessary to reduce the chance that polymeric materials produced in the process will adhere to or build up on the walls of the reactor and other equipment used. The use of surfactants during polymerization to reduce deposits on the walls of the reactor is well known in this art. The amounts of surfactants utilized are also well known and are not critical to the process of the invention.

Generally, the polymerization is conducted utilizing agitation during at least the initial stages of polymerization. As polymerization progresses, the viscosity can become so great that effective agitation of the mixture is no longer possible. The viscosity of the polymerization mixture being directly proportional to the concentration of monomers utilized and the molecular weight obtained. If desired, isolation of the polymers produced by the process of the invention can be accomplished in conventional ways.

The polymers of the invention are obtained in aqueous solution and are suitable for many uses simply upon dilution to a lower polymer solids content. The isolation as dry powders of the high molecular weight acrylamide polymers produced by processes of the prior art necessitates aqueous solubilization at the point of use. Generally, insoluble particles must be filtered out prior to use of the aqueous solution. By the process of the invention, polymerization can be conducted at the point of use. This avoids the generation of insoluble materials during the usual isolation process which need not take place.

The polymer solutions of the invention are useful in the mining and process industries, the paper industry, oil well applications and drinking water and waste-water treatment. In the mining and process industries, solids must be separated from water in process streams in which they are suspended. The separation process can be one involving settling, filtration, centrifuging or combinations thereof. The objective of the separation is the recovery of a valuable, relatively water-free cake or filtrate or the production of solid or liquid products suitable for disposal. The addition of a high molecular weight polyacrylamide as a flocculant ties together the colloidal particles in the process stream, thus forming heavy agglomerates which settle out rapidly leaving a supernatant liquid free of solids. Similar applications for the polymers and copolymers of acrylamide prepared by the process of the invention exist in the paper industry and in water and waste-water treatement. In oil well applications, high molecular weight polyacrylamides improve the efficiency of secondary recovery techniques such as aqueous hydraulic fracturing and waterflood treatment of oil reservoirs. The use of dilute solutions of polyacrylamides in the hydraulic fracturing operation reduces the friction loss of the fracturing fluid and the horsepower requirement of the pumping units by reducing the extremely high pressure drops which develop during the hydraulic fracturing operation where polyacrylamides are not utilized as additives.

Because of the simplicity of the process of the invention and its relative freedom from the need to provide adjustments in pH and since the process does not require the use of deionized water or even purified acrylamide monomer, the process of the invention is particularly suited for the preparation of high molecular weight polyacrylamide homopolymers at the site of an oil well, paper mill or waste-water treatment plant. Such production on site eliminates the necessity of isolating as a dry powder the polyacrylamide homopolymer. Shipping costs and the costs of preparing an aqueous solution of the polymer prior to use are thus eliminated. Insoluble agglomerates produced during conventional acrylamide polymer isolation processes are not characteristic of the polyacrylamide solutions produced by the process of the invention since the polymer need not be isolated where it is produced at the point of use.

Where it is desired to isolate the polymers produced by the process of the invention, it is desirable to utilize a solution-precipitation process of polymerization or alternatively, conduct the reaction in a so-called inverse emulsion in which the acrylamide polymer is present in a concentrated aqueous solution which is dispersed in an organic medium as small droplets. Generally, a surface active stabilizer is used to prevent coagulation of the emulsion. Both solution-precipitation polymerization and polymerization utilizing an inverse emulsion are procedures well known in the prior art. One skilled in the art would know how to utilize teachings herein to produce polymers in accordance with these prior art polymerization procedures. It is noted that, in the solution-precipitation procedure of polymerization, the monomer is soluble in the reaction medium but the resulting polymer is not. Thus, the medium never gets very viscous as is the case with the solution-polymerization process exemplified herein and the polymer is relatively easy to isolate and dry. Similarly, conducting the polymerization process by the inverse emulsion process does not result in a significant rise in viscosity of the medium. Thus, the polymer is relatively easy to isolate and dry as compared with a solution of the polymer.

The following examples illustrate the process of the invention. Where not otherwise specified throughout the specification and claims, temperatures are given in degrees centigrade and parts, percentages and proportions are by weight.

EXAMPLE 1

A polymer of acrylamide was prepared by the process of the invention by the following procedure. A two-liter round-bottomed flask equipped with a mechanical stirrer, thermometer and thermowell, a nitrogen sparge and two addition funnels was charged with 35.6 grams of 97 percent by weight acrylamide. The mixture was diluted with 106.7 grams of tap water, 0.35 grams of sodium metabisulfite, and one drop of a 0.1 percent by weight solution of ferrous sulphate.

The mixture was sparged with nitrogen for 0.5 hour prior to the addition of ammonium persulfate in accordance with the following procedure. One of the addition funnels on the two-liter flask was charged with dilute ammonium persulfate (0.02 grams of ammonium persulfate was mixed with 285.2 grams of tap water). The addition funnel containing the dilute ammonium persulfate was sparged with nitrogen. The ammonium persulfate solution was then added dropwise in the amount of 131.7 grams so as to add 0.0092 grams of ammonium persulfate. It was noted that polymerization initiated after a period of 40 minutes and subsequently, viscosity increased dramatically. A maximum temperature of 35° C. was reached one hour after the initiation of polymerization. The viscous unneutralized mixture obtained after 1¾ hours was diluted with 285.2 grams of water and the viscosity measured using a Brookfield viscometer, No. 2 spindle, 6 rpm at 23° C. was found to be 4200 centipoise. Further dilution to a one percent polymer solids mixture followed by neutralization provided a viscosity of 110 centipoise when measured under the same conditions.

EXAMPLE 2-8

Example 1 is repeated substituting the following redox pairs for the ammonium persulfate-sodium metabisulfite used in Example 1: ammonium persulfate and 3,3',3"-nitrilotrispropionamide; sodium bromate and sodium sulfate; sodium persulfate, and sodium bisulfite; potassium persulfate and sodium metabisulfite; ammonium persulfate and sodium bisulfite; ammonium persulfate and sodium metabisulfite; and hydrogen peroxide and thiourea. A viscous homopolymer of acrylamide is obtained.

While this invention has been described with reference to certain specific embodiments, it will be recognized by those skilled in this art that many variations are possible without departing from the scope and spirit of the invention.

The embodiments of the invention in which an exclusive privilege or property is claimed are described as follows:

1. A process for the preparation of a water-soluble, very high molecular weight homopolymer of acrylamide consisting essentially of
   (A) maintaining at ambient temperature and pressure under aqueous polymerization conditions a mixture comprising water, a catalytic amount of metal ion co-catalyst, about 10 to about 50 percent by weight of said mixture of acrylamide, and a first member of a redox pair, and
   (B) incrementally adding thereto a minimum effective amount of a second redox pair member, said amount being that sufficient to initiate polymerization under conditions of ambient temperature and pressure and the addition of said second redox pair member being terminated upon initiation of polymerization.

2. The process of claim 1 wherein said process is conducted under aqueous solution polymerization conditions and said metal ion co-catalyst is cuprous copper or ferrous iron.

3. The process of claim 1 wherein said process is conducted under solution precipitation or aqueous emulsion polymerization conditions.

4. The process of claim 2 wherein said first member of a redox pair is selected from the group consisting of at least one of sodium bisulfite, sodium sulfite, sodium metabisulfite, and combination of said sodium bisulfite with ethylenediaminetetracetic acid.

5. The process of claim 4 wherein said second redox pair member is selected from the group consisting of at least one of ammonium persulfate, potassium persulfate, and hydrogen peroxide.

6. The process of claim 5 wherein said redox pair is ammonium persulfate and sodium metabisulfite, said metal ion is ferrous iron and said polymer has a molecular weight of about 1 million to about 10 million.

7. The process of claim 2 wherein said first member of a redox pair is selected from the group consisting of at least one of ammonium persulfate, potassium persulfate, and hydrogen peroxide.

8. The process of claim 7 wherein said second redox pair member is selected from the group consisting of at least one of sodium bisulfite, sodium sulfite, sodium metabisulfite, and combination of said sodium bisulfite with ethylenediaminetetracetic acid.

9. The process of claim 7 wherein the proportion of said first activator redox pair member is about 0.05 to about 0.3 percent by weight based upon the weight of the monomer.

10. The process of claim 9 wherein said redox pair is ammonium persulfate and sodium metabisulfate, said metal ion is ferrous iron and said high molecular weight polymer has a molecular weight of about 1 million to about 10 million.

11. In a process for the preparation of a water-soluble high molecular weight homopolymer of acrylamide monomer by an aqueous solution or emulsion polymerization process conducted at ambient temperatures and pressures without the use of polymerization regulators in the presence of a redox pair catalyst and a metal ion co-catalyst, wherein at least one of said solution, emulsion or monomer is contaminated with small amounts of polymerization inhibiting components, the improvement consisting essentially of maintaining a minimum effective amount of redox catalyst in admixture with about 10 to about 50 percent by weight of said acrylamide monomer, wherein a first member of a redox pair catalyst is admixed with said monomer in the amount of 0.05 to 0.3 percent by weight based upon the weight of said acrylamide monomer, and a polymerization-initiating effective amount of a second member of a redox pair catalyst is added thereto until the initiation of said polymerization begins, said initiation being determined by a 2° C. to 5° C. exotherm and the addition of said second member of a redox pair catalyst being terminated upon initiation of polymerization.

12. The process of claim 11 wherein said process is an aqueous solution polymerization process wherein said redox pair is selected from the group consisting of ammonium persulphate and sodium metabisulphate, ammonium persulfate and 3,3',3"-nitrilotrispropionamide; sodium bromate and sodium sulfate; sodium persulfate, and sodium bisulfite; potassium persulfate and sodium metabisulfite; ammonium persulfate and sodium bisulfite; ammonium persulfate and sodium metabisulfite; and hydrogen peroxide and thiourea, said metal ion is ferrous iron, and said high molecular weight polymer has a molecular weight of about 1 million to about 10 million.

* * * * *